United States Patent [19]
Yang

[11] Patent Number: 5,924,709
[45] Date of Patent: Jul. 20, 1999

[54] WHEELED GOLF BAG SUPPORT BASE AND ASSOCIATED HANDLE

[76] Inventor: Fu-Hsiung Yang, 2nd Floor, No. 7, Chung-Long Ln, San Ming Rd., Sec. 2, Pan-Chiao, Taiwan

[21] Appl. No.: 08/831,432

[22] Filed: Apr. 1, 1997

[30] Foreign Application Priority Data

Jan. 29, 1997 [TW] Taiwan ................................. 86201692

[51] Int. Cl.$^6$ ................................ B62B 1/00; B62B 1/16
[52] U.S. Cl. ................................ 280/47.26; 280/47.315; 280/655.1; 280/47.131; 280/47.17
[58] Field of Search .............................. 280/47.24, 47.26, 280/47.315, 33, 63, 655, 655.1

[56] References Cited

U.S. PATENT DOCUMENTS

| | | | |
|---|---|---|---|
| 1,955,463 | 4/1934 | Lathrop | 280/47.33 |
| 2,073,114 | 3/1937 | Martin et al. | 280/47.33 |
| 2,467,075 | 4/1949 | Birnberg | 280/47.33 |
| 2,467,076 | 4/1949 | Birnberg | 280/47.33 |
| 2,520,226 | 8/1950 | Smith | 280/47.33 |
| 2,658,771 | 11/1953 | Rutledge et al. | 280/47.33 |
| 4,544,173 | 10/1985 | Kellermeyer | 280/47.33 |

FOREIGN PATENT DOCUMENTS

| | | |
|---|---|---|
| 155883 | 4/1991 | Romania . |
| 279375 | 6/1996 | Romania . |

*Primary Examiner*—Charles T. Jordan
*Assistant Examiner*—Charles R. Ducker, Jr.
*Attorney, Agent, or Firm*—Smith, Gambrell & Russell; Beveridge, DeGrandi, Weilacher & Young; Intellectual Property Group

[57] ABSTRACT

A golf bag includes a bag body and a base disk mounted onto the bottom of the bag body. The base disk is provided with two wheel seats each receiving a wheel and at least one leg, whereby the golf bag can be stably placed on the ground to be in a standing condition. If required, a handle can be provided at the upper end of the bag body, on a side above the wheels such that the golf bag can be slanted and moved when users grasp the upper end of the bag body or pull the handle in order to move the wheels.

6 Claims, 6 Drawing Sheets

WHEELED GOLF BAG SUPPORT BASE AND ASSOCIATED HANDLE

BACKGROUND OF THE INVENTION

1. Field of the Invention

The present invention relates to a golf bag in general, and in particular to a golf bag having wheels and legs, suitable for moving, and standing or being placed on the ground.

2. Description of the Prior Art

When playing golf, the total weight of a golf bag containing more than ten golf clubs will amount to more than ten kg. Therefore, it is a problem if the golf bag is easy to carry and facilitate to move.

Prior art device such as R.O.C. Patent Publication No. 279375 "Collapsible assembly device of a golf bag and a carrier" discloses a golf bag which can be connected with a carrier. Although such device can be easily pushed and moved by users, its structure is complex and is not easy to be disassembled or be assembled.

R.O.C. Patent Publication No. 155883 "Improvement of hub of wheel of golf bag carrier" discloses a golf bag carrier. Such golf bag carrier can be applied to various golf bags and is easy to be pushed and moved, but its volume is large and is not easy to be stored.

BRIEF SUMMARY OF THE INVENTION

The invention discloses a golf bag comprising a bag body and a base disk mounted onto the bottom of the bag body. The base disk is provided with two wheel seats each receiving a wheel and at least a leg whereby the bag can stand and can be stably placed on the ground to be in a standing condition, and if required, a handle can be provided at the upper end of the bag body, on a side above the wheels such that the golf bag can be slanted and be in a moving condition when users grasp the upper end of the bag body or pull the handle in order to move the wheels.

Although it is not necessary for the golf bag of the invention to provide a handle, a handle (especially an extensible handle) may be more convenient for the use of the golf bag.

Accordingly, it is an object of the present invention to provide a golf bag which is provided with wheels for being easily moved and being able to stably stand and placed on the ground in order to increase the stability of the bag.

It is a further object of the present invention to provide a golf bag which is provided with wheels, but has a simple structure and does not occupy large space and is easy to be maintained, manufactured and used.

It is a further object of the present invention to provide a golf bag which can be carried on the back of users, and by means of the wheels provided on the bag, can be easily pushed and moved by users toward the desired direction.

BRIEF DESCRIPTION OF THE DRAWINGS

These and other attributes of the present invention will become more clear upon a thorough study of the following description of the preferred embodiments for carrying out the invention, particularly when reviewed in conjunction with the drawings, wherein.

DETAILED DESCRIPTION OF THE INVENTION

Figure 1:
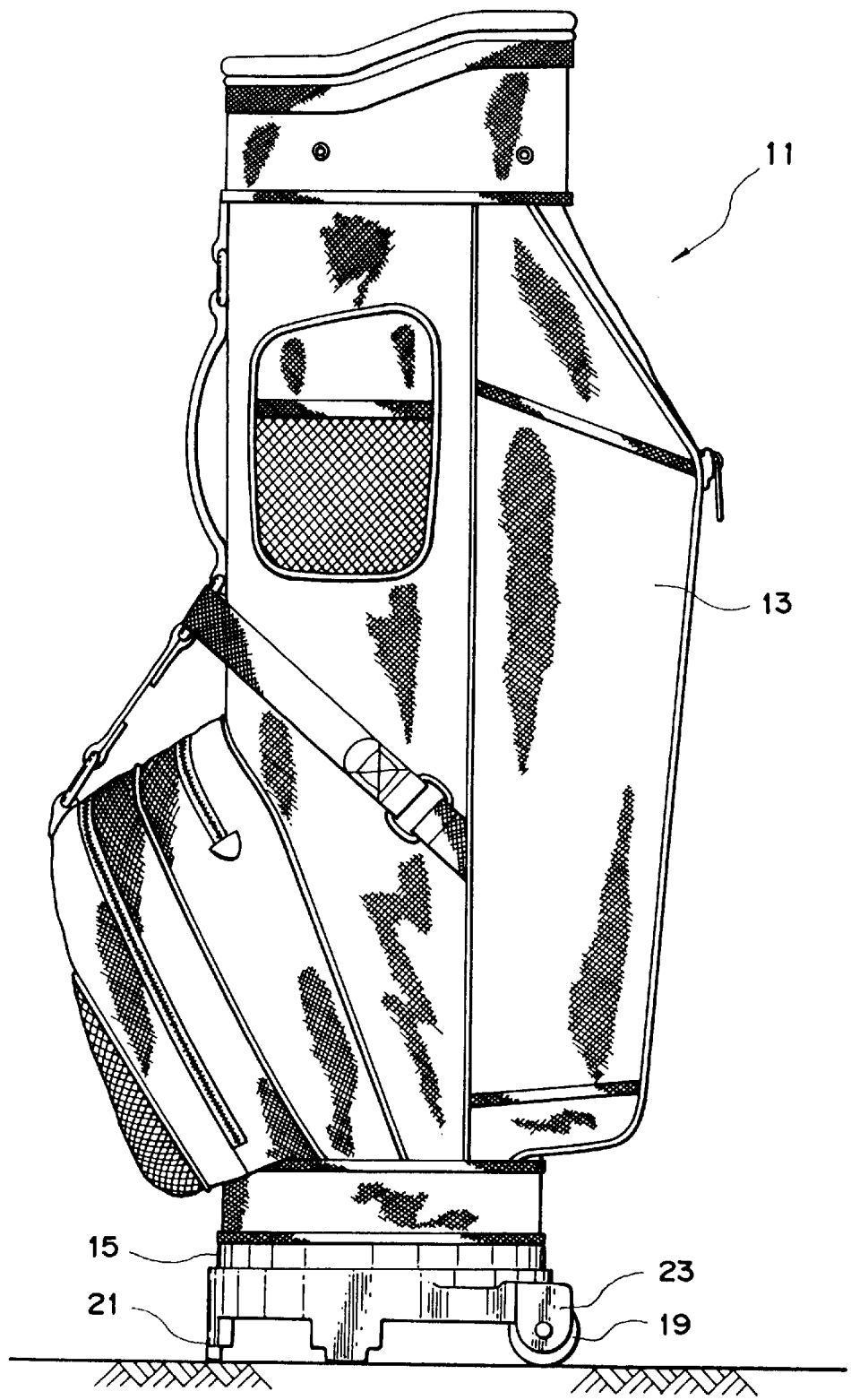
FIG. 1 is a side view of a golf bag without a handle in accordance with the present invention showing its standing condition.
Figure 2:
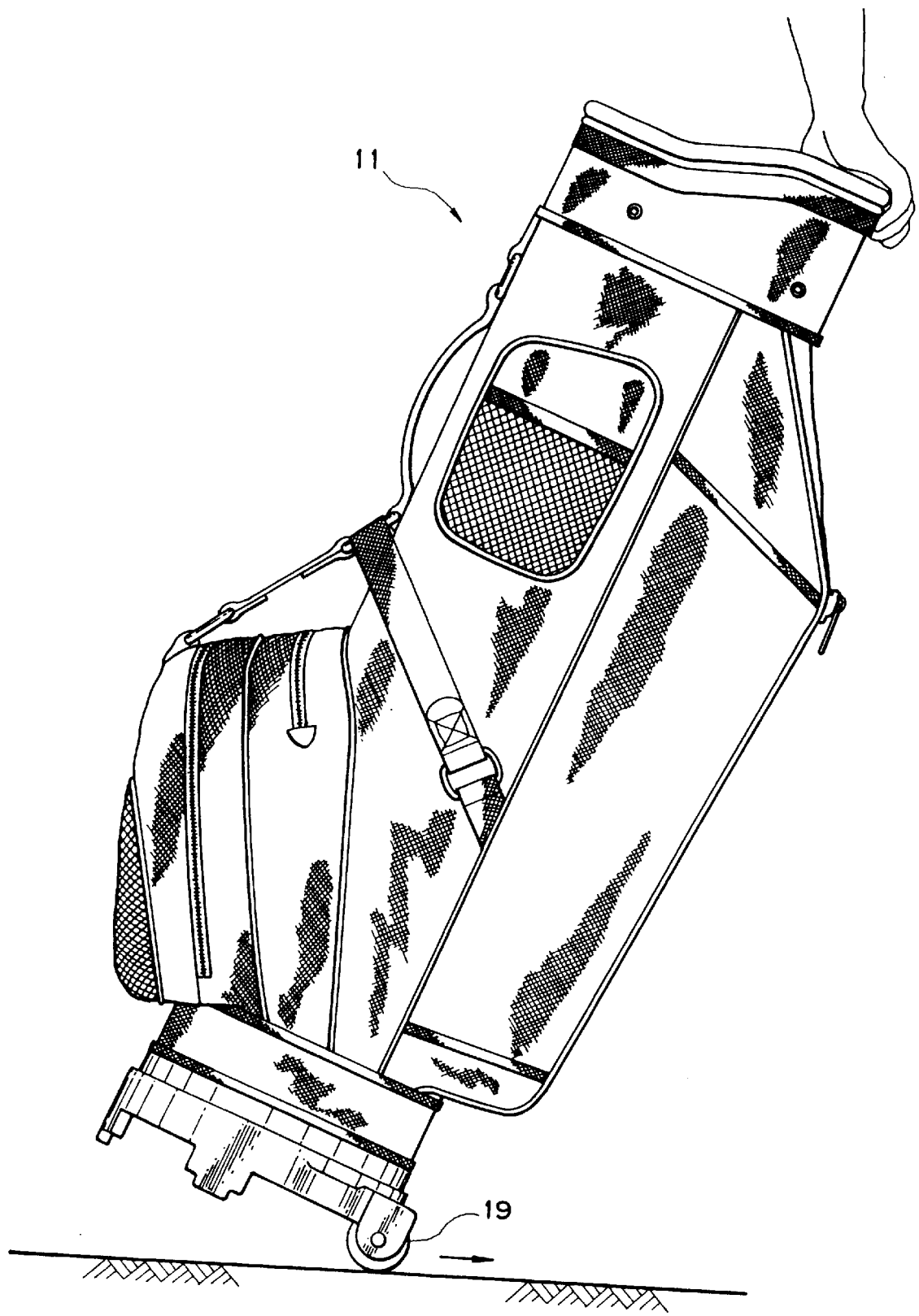
FIG. 2 is a side view of the bag of FIG. 1 showing the moving condition of the bag.
Figure 6:
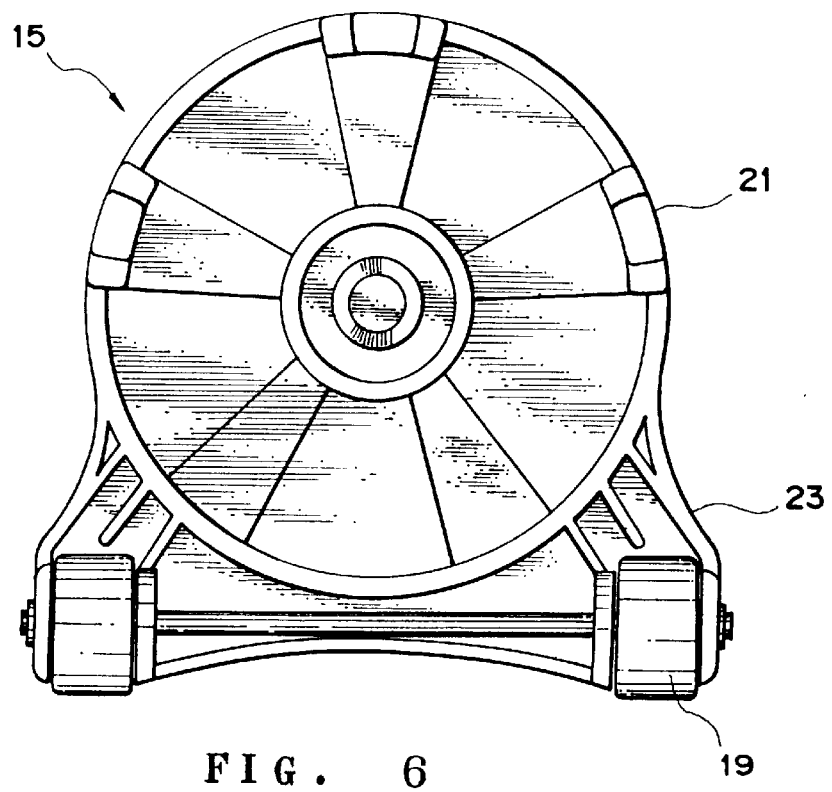
FIG. 6 is a bottom view of the base disk of FIG. 5.

Please refer to FIG. 1 to FIG. 8. The golf bag 11 of the present invention mainly comprises a bag body 13 for receiving golf clubs (not shown) and a base disk 15 mounted onto the bottom of the bag body 13. One side of the base disk 15 is provided with two wheel seats 23 parallel to each other for mounting two freely rolling wheels 19 (as shown in FIG. 6). At the bottom of the base disk 15, another side opposite to said one side of the base disk 15 is provided with at lease one leg 21 of which the lower edge and the lower edges of the wheels are co-planar whereby the golf bag 11 can be stably placed on the ground to be in a standing condition as shown in FIG. 1, and the golf bag 11 also can be slanted by using the wheels as points of support and can be moved by users who grasp the upper end of the bag body 13 in order to move the wheels, as shown in FIG. 2.

Figure 4:
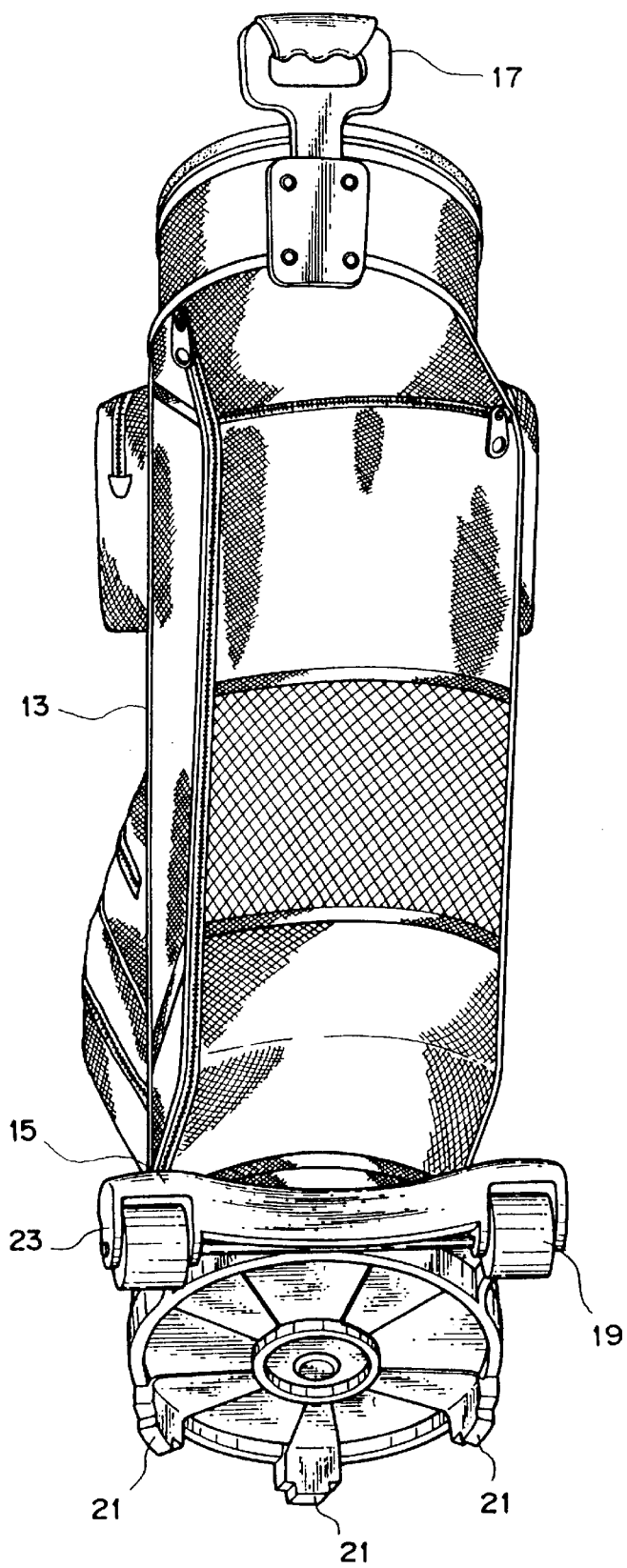
FIG. 4 is a perspective view showing the structure of a base disk of the golf bag of FIG. 3.
Figure 5:
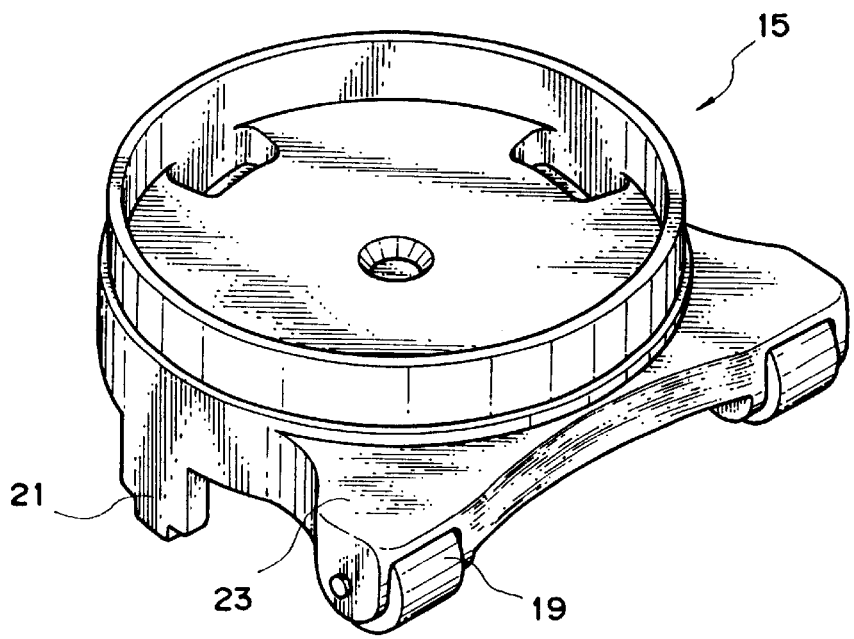
FIG. 5 is a perspective view of the base disk of the golf bag in accordance with the present invention.

As shown in the figures, the base disk 15 can be formed into a flat container opening upwards, and the lower end of the bag body 13 is fitted into the space of said flat container such that the bag body 13 can be connected with the base disk 15, as shown in FIG. 4.

The base disk 15 is preferably provided with three symmetrically arranged legs 21 (as shown in FIG. 4 and FIG. 6). The three legs 21 and the two wheels 19 form five points contacting with the ground (i.e., in a standing condition as shown in FIG. 1). However, one or two legs 21 also can cooperate with the wheels 19 and can stably stand on the ground (not shown), The bag body 13 of the invention is an ordinary bag body for receiving golf clubs and can have various forms, such as additionally providing a pocket for receiving golf balls on the golf bag. Since the bag body 13 is not the point of the invention and is well known, it will not be detailedly described in the present invention.

Figure 3:
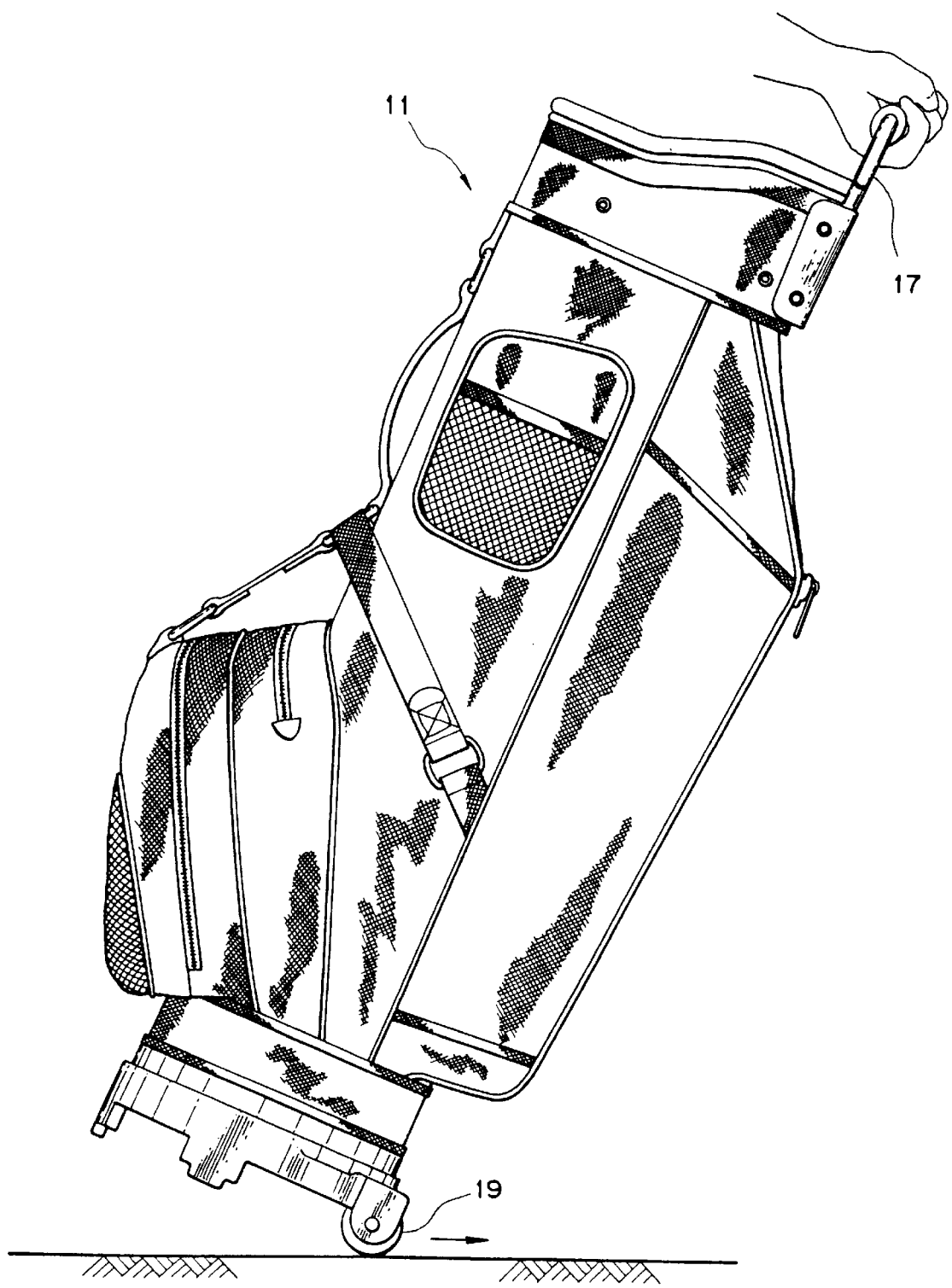
FIG. 3 is a side view of a golf bag with a handle in accordance with the present invention showing its moving condition.
Figure 7:
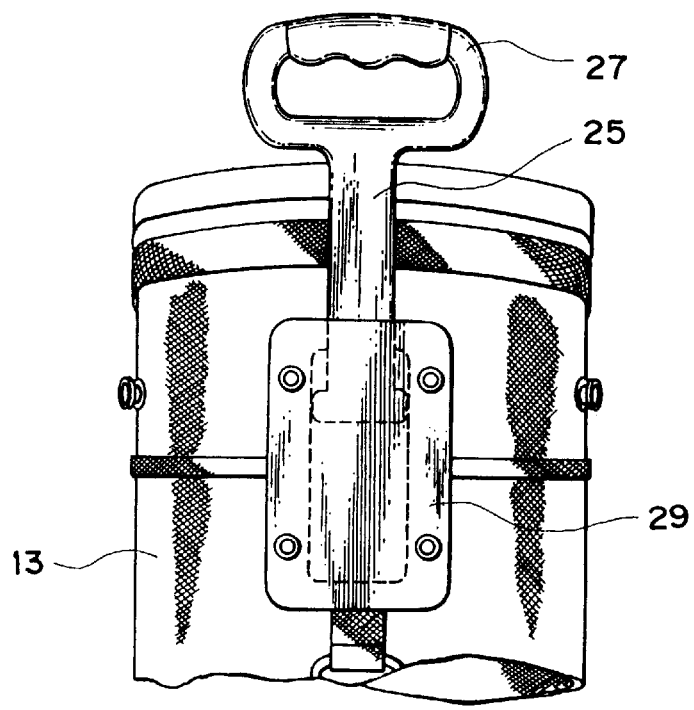
FIG. 7 is a front view showing an extensible handle when being extended.
Figure 8:
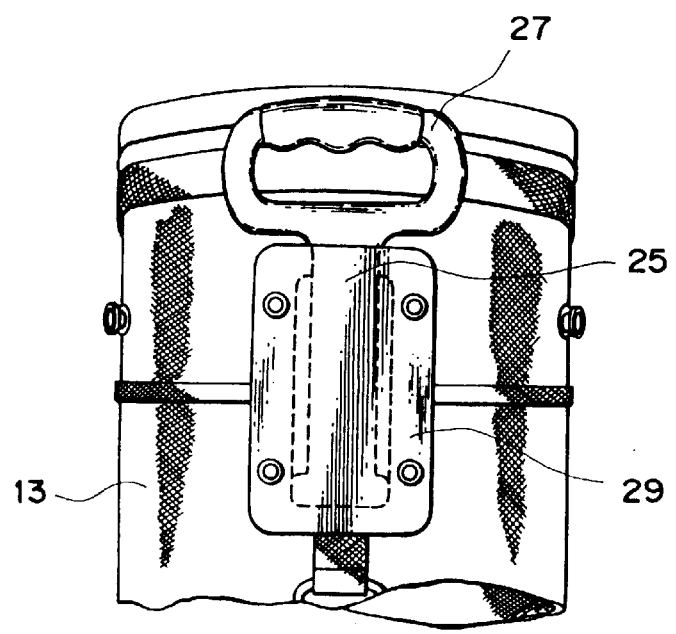
FIG. 8 is a front view showing an extensible handle when being contracted.

The golf bag 11 of the invention also can be provided with a handle 17 as shown in FIG. 3 and FIG. 4. More specifically, the handle 17 is provided at the upper end of the bag body 13, on a side above the two wheels 19 such that the golf bag 11 can be slanted and be moved when users pull the handle 17 in order to move the wheels, as shown in FIG. 3. As seen from FIG. 7 and FIG. 8, the bag body 13 also can be provided with an extensible handle 27 at the upper end thereof, on a side above the wheels. The extensible handle 27 has a shank 25 which can be freely extensibly received in a sleeve 29 (as shown in FIG. 8) and can extend from the sleeve for being grasped and pulled by users (as shown in FIG. 7).

DESCRIPTION OF THE REFERENCE NUMERALS

11 golf bag
13 bag body 15 base disk
17 handle
19 wheel
21 legs
23 wheel seat
25 shank
27 extensible handle
29 sleeve

I claim:

1. A golf bag, comprising:
   a bag body;
   a base disk mounted onto a bottom of the bag body, wherein the base disk includes:
   an internal surface,
   a peripheral wall extending from the internal surface so as to form a cylinder container, wherein the bottom of the bag body is fitted into and connected with the cylinder container of the base disk,
   two wheel seats arranged parallel to each other, wherein the two wheel seats are provided at a first side of the base disk,
   two freely rolling wheels, one mounted in each of the two wheels seats, and
   at least one leg provided at a second side of the base disk opposite to the first side having the two wheels, wherein the leg extends from a bottom of the base disk in a direction away from the peripheral wall; and
   a handle provided at an upper end of the bag body, on a side above the two wheels,
   wherein a lower edge of the leg and lower edges of the two wheels are co-planar so that the golf bag can be stably placed on the ground in a standing condition, and wherein the golf bag also can be slanted using the two wheels as points of support such that when a user grasps and pulls the handle, the golf bag can be moved using the two wheels.

2. A golf bag as claimed in claim 1, wherein the bottom of the base disk is provided with three symmetrically arranged legs.

3. A golf bag as claimed in claim 2, wherein all three legs are arranged on the second side of the base disk.

4. A golf bag as claimed in claim 1, wherein said handle is an extensible handle.

5. A golf bag, comprising:
   a bag body, wherein an upper end of the bag body defines a sleeve;
   a base disk mounted onto a bottom of the bag body, wherein the base disk includes:
   an internal surface,
   a peripheral wall extending from the internal surface so as to form a cylinder container, wherein the bottom of the bag body is fitted into and connected with the cylinder container of the base disk,
   two wheel seats arranged parallel to each other, wherein the two wheel seats are provided at a first side of the base disk,
   two freely rolling wheels, one mounted in each of the two wheels seats, and
   at least one lea provided at a second side of the base disk opposite to the first side having the two wheels, wherein the leg extends from a bottom of the base disk in a direction away from the peripheral wall; and
   a handle having a grip portion and a shank extending from the grip portion, wherein the shank fits into the sleeve of the bag body; and
   wherein a lower edge of the leg and lower edges of the two wheels are co-planar so that the golf bag can be stably placed on the ground in a standing condition, and wherein the golf bag also can be slanted using the two wheels as points of support such that when a user grasps and pulls the handle, the golf bag can be moved using the two wheels.

6. A golf bag as claimed in claim 5, wherein the shank is movable within the sleeve between a contracted position and an extended position.

* * * * *